United States Patent [19]

Mise

[11] Patent Number: 5,046,232
[45] Date of Patent: Sep. 10, 1991

[54] WORKING APPARATUS HAVING A PLURALITY OF WORKING HEADS

[75] Inventor: Tomoki Mise, Kagamihara, Japan

[73] Assignee: Murata Kikai Kabushiki Kaisha, Kyoto, Japan

[21] Appl. No.: 568,674

[22] Filed: Aug. 16, 1990

[30] Foreign Application Priority Data

Aug. 18, 1989 [JP] Japan .................................. 1-212619

[51] Int. Cl.⁵ ........................ B23Q 5/22; B21D 28/00
[52] U.S. Cl. ....................................... 29/564; 83/555; 408/31
[58] Field of Search ............... 29/563, 564, 33 P, 568, 29/33 J, 50; 72/442, 446; 83/549, 550, 551, 552, 560, 563, 555, 618; 408/1, 31, 49; 409/147, 188, 192, 198

[56] References Cited

U.S. PATENT DOCUMENTS

| | | | |
|---|---|---|---|
| 4,220,062 | 9/1980 | Blanz | 83/551 |
| 4,503,741 | 3/1985 | Hunter et al. | 83/549 |
| 4,532,843 | 8/1985 | Miyama | 83/618 X |
| 4,688,456 | 8/1987 | Stursberg | 83/560 X |
| 4,787,282 | 11/1988 | Okachi et al. | 83/552 X |
| 4,951,375 | 8/1990 | Erlenmaier | 29/568 |
| 4,987,765 | 1/1991 | Nishimura et al. | 72/446 X |

FOREIGN PATENT DOCUMENTS 252623 10/1988 Japan ..................................... 83/552

*Primary Examiner*—William Briggs
*Attorney, Agent, or Firm*—Spensley Horn Jubas & Lubitz

[57] ABSTRACT

A working apparatus comprises a plurality of working heads for processing a piece of work, a device for moving the work, first control means, and second control means. The first control means is adapted for controlling the moving device and a designated working head, so that the work may be located in a position based on the designated working head to be thereby processed. The second control means is adapted for controlling the moving device and an undesignated working head, so that the work may be located in a position based on the undesignated working head to be thereby processed, when the moving device fails to locate the work in the position based on the designated working head.

2 Claims, 4 Drawing Sheets

WORKING APPARATUS HAVING A PLURALITY OF WORKING HEADS

FIELD OF THE INVENTION

This invention relates to a working apparatus, particularly one having a plurality of working heads.

RELATED ART STATEMENT

There is, for example, known a punch press having a plurality of sets of punch and die heads for working a sheet of material, a device for supplying punches and dies to the punch and die heads, and a device including a work holder, etc. and adapted for moving the sheet.

The known punch press is so operated that a designated set of punch and die are mounted on a designated set of punch and die heads, and that the sheet is so moved by the moving device that that portion of the sheet which is to be worked on may be positioned at the designated punch and die heads. The punch and die which are to be used for the subsequent step of processing are mounted on a or the remaining set of punch and die heads, while the sheet is being worked on by the designated punch and die heads. This arrangement enables a reduction in the loss of time arising from the change of the punches and dies.

The moving device in the known punch press, however, has only a limited range of movement. Therefore, it is sometimes likely that that portion of the sheet which is to be worked on may not be brought to the designated working position. To cope with any such problem, the moving device in the known apparatus is adapted for repositioning the sheet. Such repositioning, however, takes too long a time for the rapid working of the sheet.

OBJECT AND SUMMARY OF THE INVENTION

It is an object of this invention to provide a working apparatus which can eliminate any loss of time arising from the repositioning of a sheet of material, and accomplish its working rapidly.

The working apparatus of this invention has a plurality of working heads. The apparatus comprises a plurality of working heads for processing a piece of work, a device for moving the work, first control means, and second control means.

The first control means is adapted for controlling the moving device and a designated working head, so that the work may be located in a position based on the designated working head to be thereby processed. The second control means is adapted for controlling the moving device and an undesignated working head, so that the work may be located in a position based on the undesignated working head to be thereby processed, when the moving device fails to locate the work in the position based on the designated working head.

The working apparatus of this invention is normally so operated that the first control means controls the working head and the moving device. The moving device locates the work in the position based on the designated working head and the working head processes the work.

When the moving device cannot locate the work in the position based on the designated working head, the second control means controls the working head and the moving device. The moving device locates the work in the position based on the undesignated working head and the undesignated working head processes the work. In other words, if the designated working head is not available for the processing of the work, the work is not repositioned by the moving device relative to the designated working head, but is processed by the undesignated working head. This operation enables a quicker job than when the work is repositioned.

DETAILED DESCRIPTION OF PREFERRED EMBODIMENT

Figure 1:
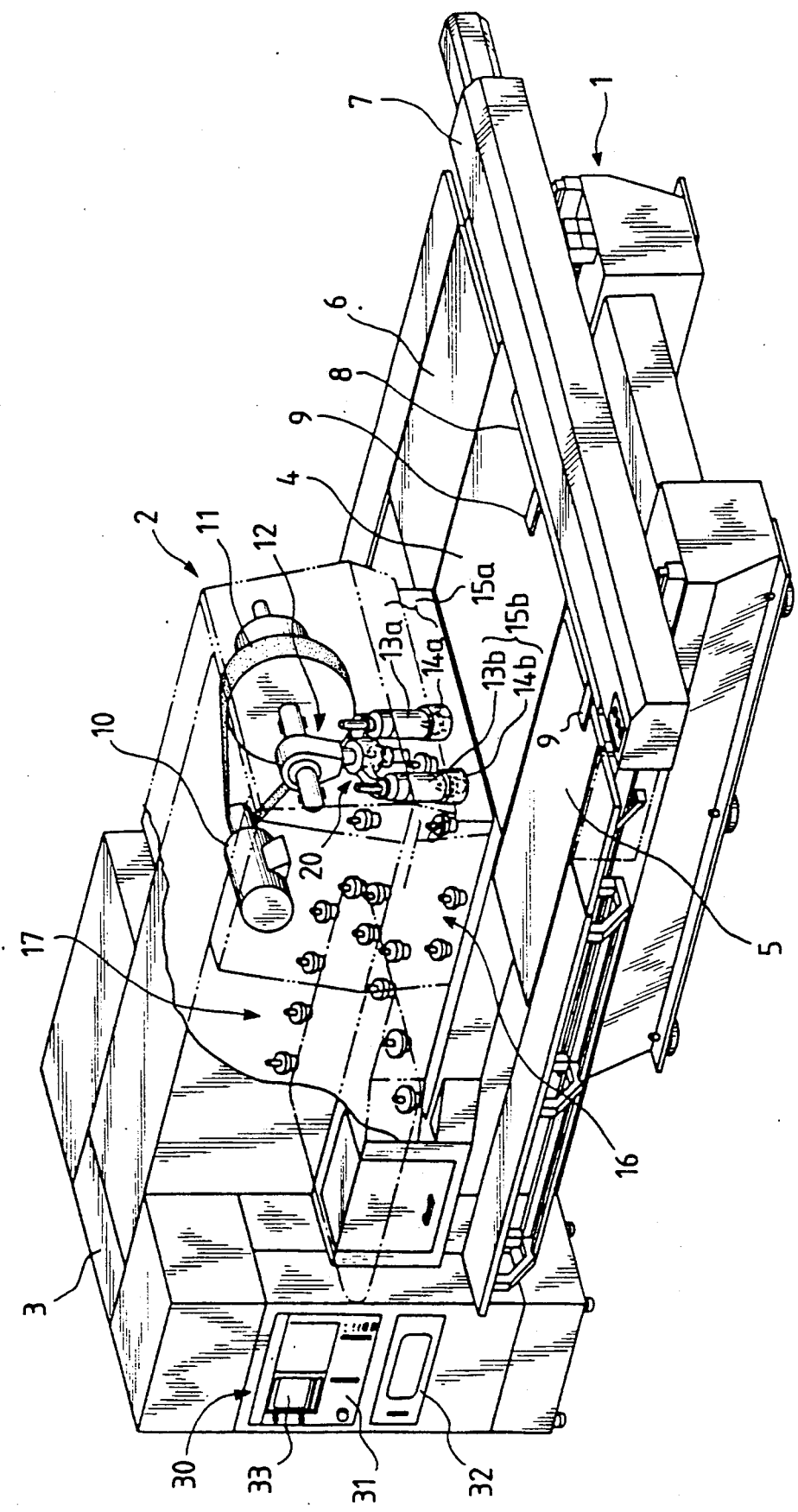
FIG. 1 is an overall perspective view of an apparatus embodying this invention.

A twin-head punch press embodying this invention is shown in FIG. 1. The punch press comprises mainly a lower frame 1, an upper frame 2, and a throat portion 3 supporting them at the rear end of the apparatus.

The lower frame 1 supports a stationary table 4 and a pair of movable tables 5 and 6 provided on both sides, respectively, thereof, as work tables on which work (a sheet of material) is mounted. The movable tables 5 and 6 are movable with a carriage 7 longitudinally of the apparatus. The carriage 7 is provided with a cross slide 8 which is movable transversely of the apparatus. The cross slide 8 is provided with a work holder 9 for holding the work.

The upper frame 2 includes a motor 10 for driving a punch, a flywheel 11, and a crank mechanism 12. The upper frame 2 is provided at its front end with two punch heads 13a and 13b which are selectively reciprocatable by the crank mechanism 12 through a selecting mechanism 20. The lower frame 1 is provided with two dies 14a and 14b facing the punch heads 13a and 13b, respectively. These two sets of punch heads and dies define two working heads 15a and 15b.

The lower and upper frames 1 and 2 define also a tool changing device 16. The throat portion 3 situated behind it forms a tool housing 17 which contains punches and dies to be supplied to the working heads 15a and 15b through the tool changing device 16. Only the arrangement of punches and dies in the tool changing device 16 and the tool housing 17 is shown in FIG. 1.

Figure 2:
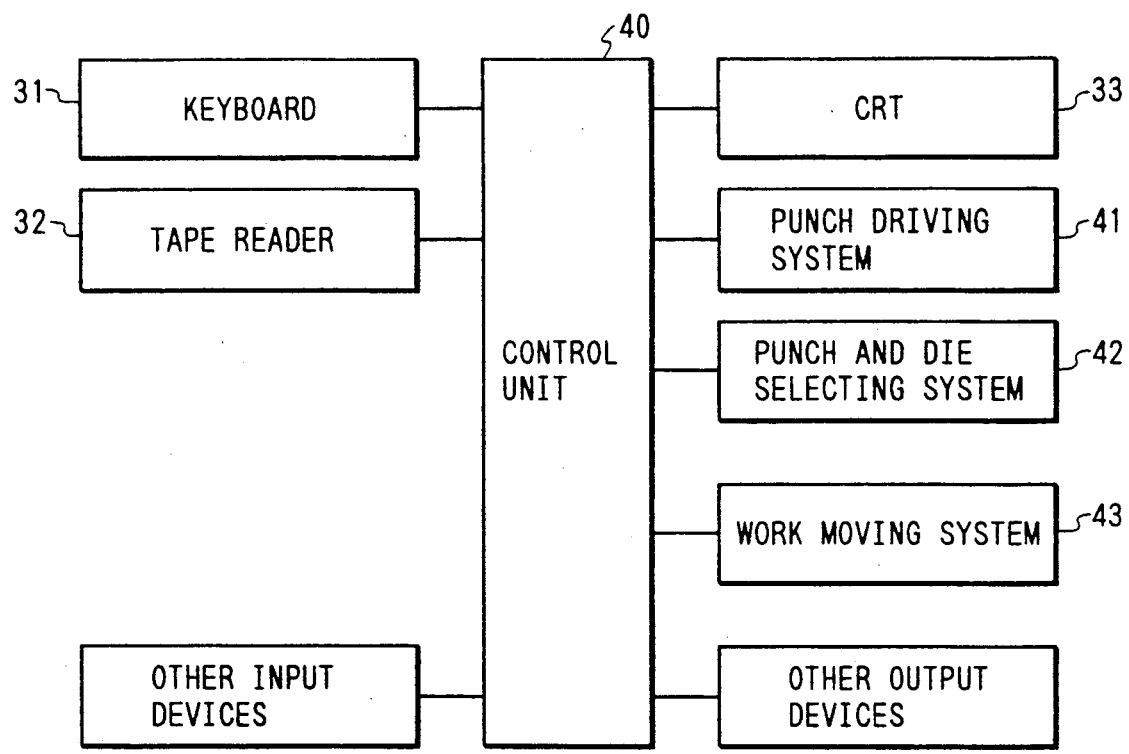
FIG. 2 is a block diagram of its control system.

A control panel 30 is provided on one side of the throat portion 3. The control panel 30 contains a control unit 40 as shown in FIG. 2. The control unit 40 includes a microcomputer which comprises a CPU, ROM, RAM, etc. A keyboard 31, a tape reader 32, and other input devices including various sensors are connected to the control unit 40. Also connected to the control unit 40 are a CRT 33 for displaying the state of control, a punch driving system 41 including the motor 10 for driving the punch heads 13a and 13b, a punch and die selecting system 42 for driving the tool changing device 16 and the tool housing 17, a work moving system 43 for driving the carriage 7 and the work holder 9, and other output devices.

Figure 3A:
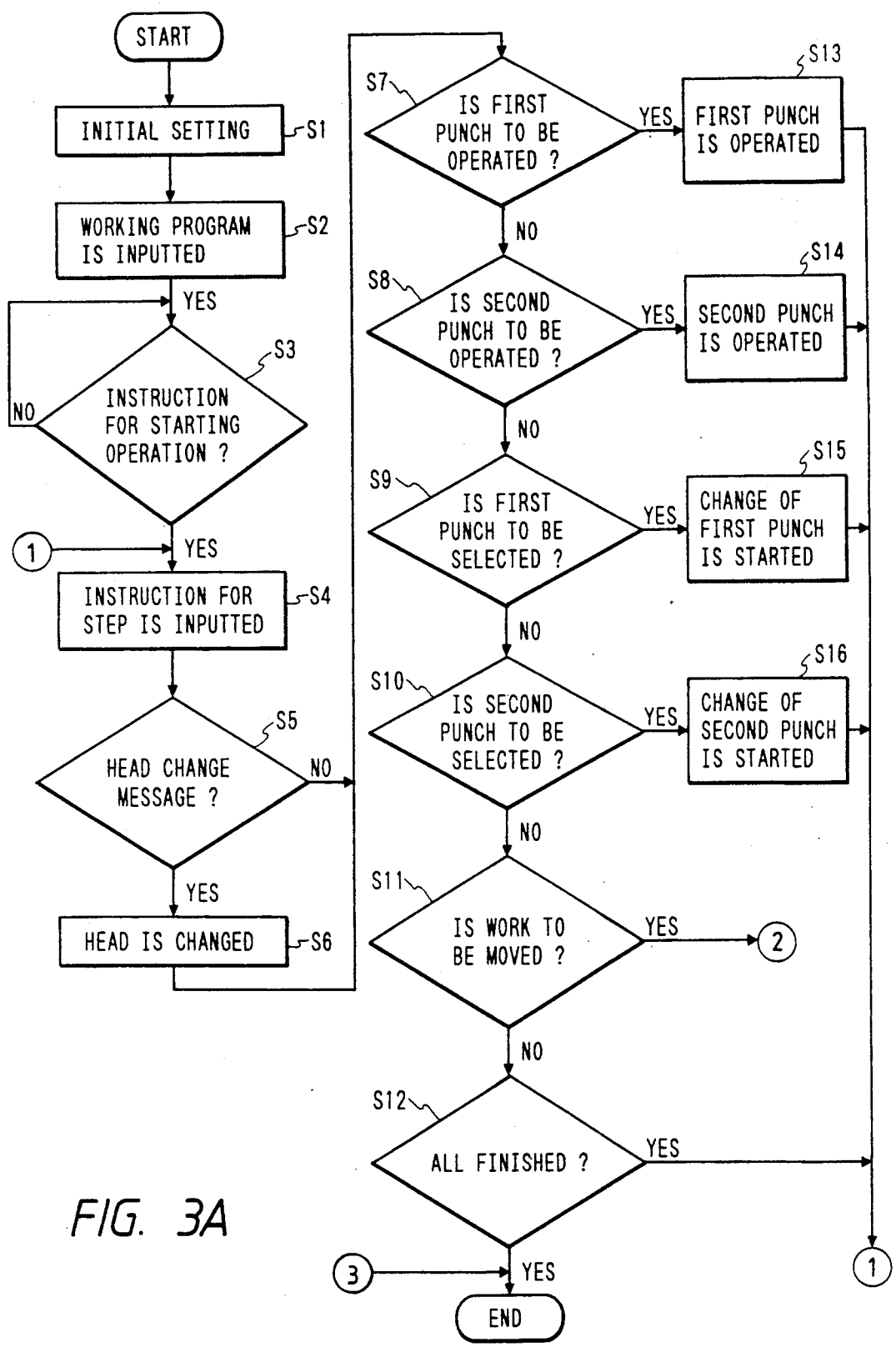
FIG. 3A and 3B are flow charts showing its operation.
Figure 3B:
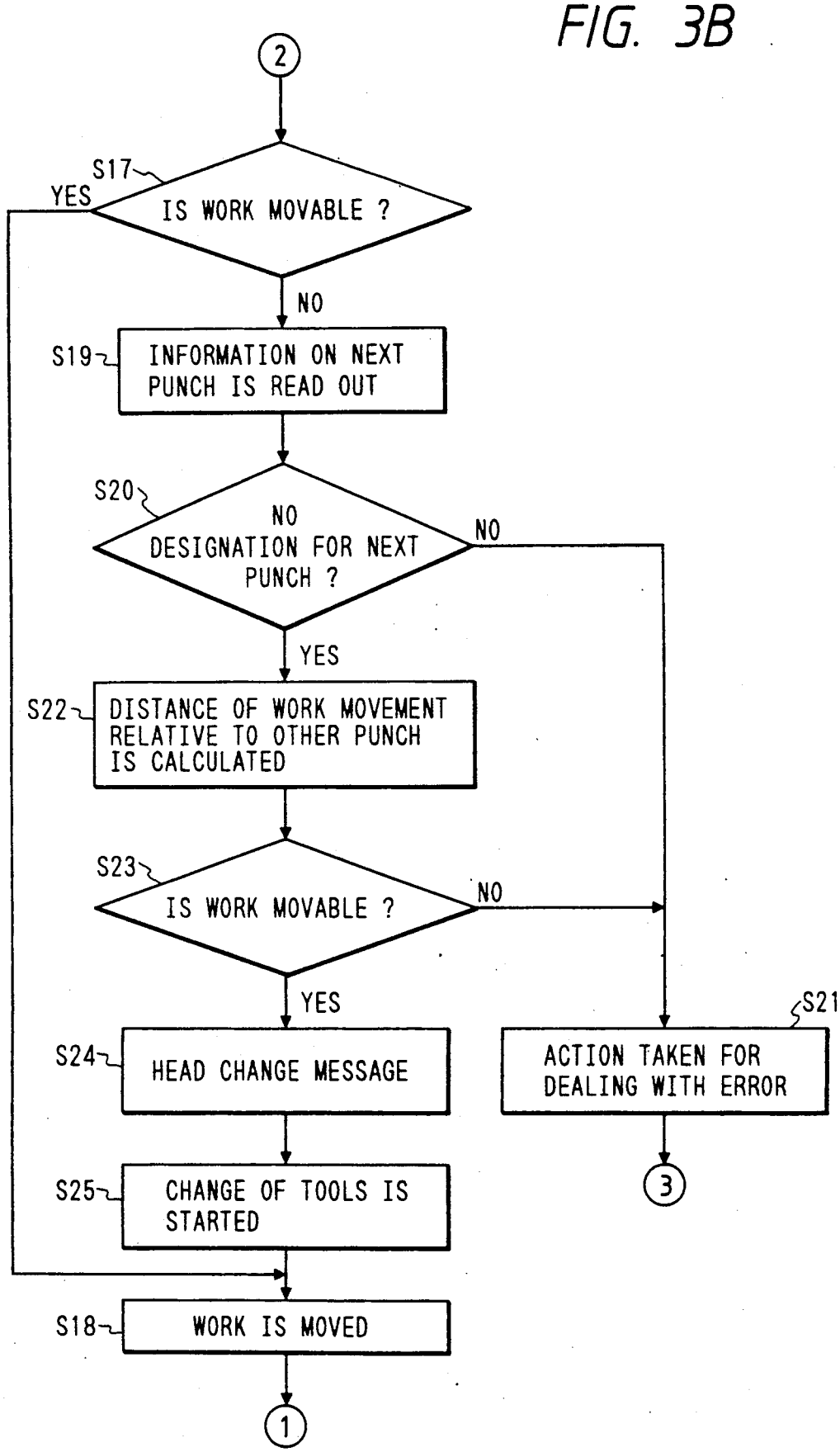

The operation of the punch press will now be described in accordance with the control flow charts which are shown in FIGS. 3A and 3B.

If a main switch provided on the punch press, though not shown, is turned on, initial setting, including the setting of the cross slide 8, the tool changing device 16, etc. in their initial positions, is performed at Step S1 as shown in FIG. 3A. At Step S2, a working program is inputted through the tape reader 33. At Step 3, the press awaits an instruction for starting operation.

If the instruction for starting operation is inputted through the keyboard 31, the operation proceeds to Step S4. The first instruction step of the working program is inputted at Step S4. At Step S5, judgment is made as to the presence of a head change message, which will later be described in detail. As no such message is present during the first stage of the operation, the operation proceeds to Step S7 without following Step S6.

At Steps S7 to S11, judgment is made as to the kind of the inputted instruction step. At Step S7, judgment is made as to whether the inputted step is the operation of the first punch (the punching operation by the working head 15a), or not. At Step S8, judgment is made as to whether it is the operation of the second punch (the punching operation by the working head 15b), or not. At Step S9, judgment is made as to whether it is the selection of the first punch (the selection of the punch for the working head 15a), or not. At Step S10, judgment is made as to whether it is the selection of the second punch (the selection of the punch for the working head 15b), or not. At Step S11, judgment is made as to whether the instruction is for the movement of the work by the carriage 7 and the cross slide 8, or not. At Step S12, judgment is made as to whether all the steps of the working program have been finished, or not. If the inputted instruction is not for the last step, the operation returns to Step S4.

If the inputted instruction is for the step concerning the operation of the first punch, the program proceeds from Step S7 to Step S13. At Step S13, the first punch is placed in operation. More specifically, the punch head 13a is selected by the selecting mechanism 20, and is moved up and down by the driving mechanism including the motor 10, whereby the work (sheet) mounted on the tables 4, 5 and 6 is punched. As soon as the operation of the first punch has been finished, the program returns to Step S4. If the inputted instruction is for the step concerning the operation of the second punch, the program proceeds from Step S8 to Step S14. At Step S14, the punch head 13b is selected by the selecting mechanism 20, and is moved up and down by the driving mechanism including the motor 10, whereby the work is punched. As soon as the operation of the second punch has been finished, the program returns to Step S4.

If the inputted instruction is for the selection of the first punch, the program proceeds from Step S9 to Step S15. At Step S15, an instruction is given for starting the change of the first punch. The tool changing device 16 and the tool housing 17 are placed in operation for changing the punch and die in the working head 15a to the designated punch and die. The tool changing device 16 and the tool housing 17 supply the designated punch and die to the working head 15a in accordance with the instruction which has been given at Step S15 for starting the change of the punch. As soon as the instruction has been fulfilled, the program returns from Step S15 to Step S4. If the inputted instruction is for the selection of the second punch, the program proceeds from Step S10 to Step S16. At Step S16, an instruction is given for starting the change of the second punch. In response to the instruction, the tool changing device 16 and the tool housing 17 supply the designated punch and die to the working head 15b. As soon as the instruction has been fulfilled, the program returns from Step S16 to Step S4.

The punch changing operation of the tool changing device 16 and the tool housing 17 is performed, while the main program under description is carried out.

If the instructed step which has been inputted at Step S4 is for the movement of the work, the program proceeds from Step S11 to Step S17 as shown in FIGURE 3B. At Step S17, judgment is made as to whether the work is movable by the carriage 7 and the cross slide 8 to the position as designated for its working, or not. If it is movable, the program proceeds to Step S18 and the carriage 7 and the cross slide 8 are moved to locate the work in the designated position. As soon as Step S18 has been carried out, the program returns to Step S4 as shown in FIGURE 3A.

The various modes of control as hereinabove described are so combined that, while one of the working heads 15a or 15b is processing the work, or while the carriage 7 and the cross slide 8 are moving the work, the tool changing device 16 and the tool housing 17 may accomplish the change of tools for the other working head 15b or 15a that is out of punching operation. When one cycle of operation has been performed by the on e working head 15a or 15b, another cycle of operation is started by the other working head 15b or 15a already carrying the necessary punch and die, and by the carriage 7 and the cross slide 8. During this cycle of operation, the change of tools for the working head 15a or 15b which has been used for the previous cycle of punching operation is effected by the tool changing device 16 and the tool housing 17. Thus, it is possible to eliminate any loss of time that would otherwise arise from the change of tools.

It is now supposed that, though the instructed step is for the movement of the work, the limits within which the carriage 7 or the cross slide 8 is movable disable the work to be moved to the designated position. In such a case, the program proceeds from Step S11 in FIGURE 3A to Step S17 in FIGURE 3B, and further to Step S19. At Step S19, information on the punch which is going to be used is read out. This is primarily the punch which is going to be used with the designated working head 15a or 15b. At Step S20, judgment is made as to the presence of any designation for the punch which is going to be used. If no such designation is present, the operation can no longer be continued, but the program proceeds to Step S21, and after a display indicating the occurrence of an error has been made on the CRT 33 and a step against the error, such as the stopping of the machine, has been taken, the operation is brought to an end. If Step S20 teaches the presence of any designation for the punch, the program proceeds to Step S22. At Step S22, the distance by which the work need be moved is calculated from the distance designated for the movement of the work and the distance between the working heads 15a and 15b. This is done for locating the designated portion of the work at the working head 15a or 15b which has not been designated, but is going to be used. At Step S23, judgment is made as to whether the work is moveable in accordance with the results of the calculation made at Step S22, or not. If no such movement of the work is possible, the program proceeds to Step S21, and after any step for dealing with the error has been taken, the operation is brought to an end. If Step S23 teaches that the movement of the work is possible, the program proceeds to Step S24. At Step S24, a message is left to tell that the working head which is going to be used has been changed to 15a or 15b. More specifically, a flag is, for example, used. At Step S25, an instruction to start the change of tools is given to the tool changing device 16 and the tool housing 17 so that they may set the designated tools on the working head 15a or 15b which is going to be used. At Step S18, the work is moved in accordance with the results of the calculation made at Step S22, and the program returns to Step S4 in FIG. 3A.

It is now supposed that an instruction for the punching operation by the working head 15a or 15b has been inputted at Step S4. In this case, the judgment made at Step S5 is in the affirmative and the program proceeds to Step S6. At Step S6, the working head 15a designated one to the undesignated one. Then, the program proceeds from Step S7 or S8 to Step S13 or S14 and the punching operation is performed. It follows that, when the work cannot be moved to the working position based on the working head 15a or 15b as designated by the working program, it is processed by the undesignated working head 15a or 15b instead of being repositioned by the work holder 9. This enables quicker working than when the work is repositioned.

When the judgment made at Step S23 is in the negative, it is possible to reposition the work to continue any subsequent processing, instead of taking any action for dealing with the error (Step S21).

When the work cannot be located in the position based on the designated working head, the working apparatus of this invention is operable with the undesignated working head without having the work repositioned. Therefore, it can eliminate the loss of a comparatively long time which would result from such repositioning, and thereby finish working rapidly.

What is claimed is:

1. A working apparatus having a plurality of working heads which comprises:
    a plurality of working heads for processing a piece of work;
    a device for moving said work;
    first control means for controlling said moving device and a designated one of said working heads, so that said work may be located in a position based on said designated working head so as to be thereby processed; and
    second control means for controlling said moving device and an undesignated one of said working heads, so that said work may be located in a position based on said undesignated working head so as to be thereby processed, when said moving device fails to locate said work in said position based on said designated working head.

2. A working apparatus as claimed in claim 1, wherein a control unit including said first control means and said second control means is connected with a CRT for displaying the state of control, a punch driving system including a motor for driving punch heads, a punch and die selecting system for driving a tool changing device and a tool housing, a work moving system for driving a carriage and a work holder, and output devices.

* * * * *